(12) United States Patent
Jung

(10) Patent No.: US 10,303,597 B2
(45) Date of Patent: *May 28, 2019

(54) COMPUTING DEVICE, DATA TRANSFER METHOD BETWEEN COPROCESSOR AND NON-VOLATILE MEMORY, AND COMPUTER-READABLE RECORDING MEDIUM

(71) Applicants: MemRay Corporation, Seoul (KR); YONSEI UNIVERSITY, UNIVERSITY—INDUSTRY FOUNDATION (UIF), Seoul (KR)

(72) Inventor: Myoungsoo Jung, Incheon (KR)

(73) Assignees: MEMRAY CORPORATION, Seoul (KR); YONSEI UNIVERSITY, UNIVERSITY—INDUSTRY FOUNDATION (UIF), Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/010,583

(22) Filed: Jun. 18, 2018

(65) Prior Publication Data

US 2018/0300230 A1   Oct. 18, 2018

Related U.S. Application Data

(63) Continuation of application No. 15/168,423, filed on May 31, 2016, now Pat. No. 10,013,342.

(30) Foreign Application Priority Data

Feb. 15, 2016   (KR) .......................... 10-2016-0017233

(51) Int. Cl.
*G06F 12/02* (2006.01)
*G06F 12/06* (2006.01)
*G06F 13/40* (2006.01)

(52) U.S. Cl.
CPC .......... *G06F 12/023* (2013.01); *G06F 12/063* (2013.01); *G06F 13/4068* (2013.01);
(Continued)

(58) Field of Classification Search
CPC ............... G06F 12/023; G06F 13/4068; G06F 2212/251; G06F 11/203; G06F 12/0868;
(Continued)

(56) References Cited

U.S. PATENT DOCUMENTS 10,013,342 B2 *   7/2018   Jung ..................... G06F 12/023
2006/0075164 A1   4/2006   Ooi
(Continued)

OTHER PUBLICATIONS

Jie Zhang et al., "NVMMU: A Non-Volatile Memory Management Unit for Heterogeneous GPU-SSD Architectures", PACT 15, Oct. 19, 2015.
(Continued)

*Primary Examiner* — Zhuo H Li
(74) *Attorney, Agent, or Firm* — Lex IP Meister, PLLC

(57) ABSTRACT

A computing device includes a CPU, a CPU memory for CPU, a non-volatile memory, a coprocessor using the non-volatile memory, a coprocessor memory for storing data to be processed by the coprocessor or data processed by the coprocessor, and a recording medium. The recording medium includes a controller driver for the non-volatile memory and a library that are executed by the CPU. The controller driver maps the coprocessor memory to a system memory block of the CPU memory. The library moves data between the coprocessor and the non-volatile memory via the system memory block mapped to the coprocessor memory.

18 Claims, 12 Drawing Sheets

(52) U.S. Cl.
CPC .......... *G06F 2212/1024* (2013.01); *G06F 2212/205* (2013.01); *G06F 2212/206* (2013.01); *G06F 2212/214* (2013.01); *G06F 2212/251* (2013.01); *G06F 2212/7201* (2013.01); *G06F 2212/7202* (2013.01)

(58) Field of Classification Search
CPC ......... G06F 2201/805; G06F 2209/509; G06F 3/064; G06F 9/3004; G06F 9/3877; G06F 9/5027; G06F 9/5044
See application file for complete search history.

(56) References Cited

U.S. PATENT DOCUMENTS

| | | | |
|---|---|---|---|
| 2008/0184273 A1* | 7/2008 | Sekar | G06F 13/102 719/319 |
| 2013/0141443 A1 | 6/2013 | Schmit | |
| 2014/0164732 A1 | 6/2014 | Muff et al. | |
| 2016/0041917 A1* | 2/2016 | Trojanowski | G06F 3/068 711/120 |
| 2016/0170849 A1 | 6/2016 | Cheng et al. | |
| 2017/0206169 A1 | 7/2017 | Coppola et al. | |

OTHER PUBLICATIONS

Shuai Che et al., "Rodinia: A Benchmark Suite for Heterogeneous Computing", IEEE Computer Society Washington, DC, USA, Oct. 4, 2009, pp. 44-54.

Wenbin Fang et al., Mars: Accelerating MapReduce with Graphics Processors, IEEE Transactions on Parallel and Distributed Systems, vol. 22, No. 4, Apr. 2011, pp. 608-620.

Chris Gregg et al., "Where is the Data? Why You Cannot Debate CPU vs. GPU Performance Without the Answer", Performance Analysis of Systems and Software (ISPASS), 2011 IEEE International Symposium on, Apr. 2011, pp. 134-144.

Daniel Lustig and Margaret Martonosi, "Reducing GPU Offload Latency via Fine-Grained CPU-GPU Synchronization", IEEE, Feb. 2013, pp. 354-365.

Ren Wu, Bin Zhang, Meichun Hsu, "GPU-Accelerated Large Scale Analytics", HP Laboratories, Mar. 6, 2009.

Naga K. Govindaraju et al., "A Memory Model for Scientific Algorithms on Graphics Processors", IEEE, Nov. 2006.

Peter Bakkum and Kevin Skadron, "Accelerating SQL Database Operations on a GPU with CUDA", ACM, Mar. 2010, pp. 94-103

Naga K. Govindaraju et al., "High Performance Discrete Fourier Transforms on Graphics Processors", IEEE, Nov. 15, 2008, Article No. 2.

Changqing Ji et al., "Big Data Processing in Cloud Computing Environments", IEEE, Dec. 2012, pp. 17-23.

Mustafa Shihab et al., "GPU drive: Reconsidering Storage Accesses for GPU Acceleration", Fourth Workshop on Architectures and Systems for Big Data (ASBD), Jul. 16, 2014.

Danny Cobb et al., "NVM Express and the PCI Express* SSD Revolution", Intel Developer Forum 2012, Apr. 2013.

John A. Stratton et al., "Parboil: A Revised Benchmark Suite for Scientific and Commercial Throughput Computing", IMPACT Technical Report(University of Illinois), Mar. 2, 2012.

Jeff A. Stuart et al., "Multi-GPU MapReduce on GPU Clusters", IEEE, May 2011, pp. 1068-1079.

Catalog, "NVIDIA-GPU-Accelerated Applications", NVIDIA Corporation, Jun. 2015.

Catalog, "NVIDIA Kepler GK110 Next-Generation CUDA® Compute Architecture", NVIDIA Corporation, May 2012.

Jeff Bolz et al., "Sparse Matrix Solvers on the GPU: Conjugate Gradients and Multigrid", ACM, vol. 22 Issue 3, Jul. 2003, pp. 917,924

Technology Brief, "NVIDIA GPUDirect™ Technology—Accelerating GPU-based Systems", Mellanox, May 2010.

Feng Chen et al., "Understanding Intrinsic Characteristics and System Implications of Flash Memory based Solid State Drives", ACM, Jun. 15, 2009, pp. 181-192.

* cited by examiner ardım # COMPUTING DEVICE, DATA TRANSFER METHOD BETWEEN COPROCESSOR AND NON-VOLATILE MEMORY, AND COMPUTER-READABLE RECORDING MEDIUM

CROSS-REFERENCE TO RELATED APPLICATION

This application is a continuation of U.S. patent application Ser. No. 15/168,423, filed on May 31, 2016, which claims priority to and the benefit of Korean Patent Application No. 10-2016-0017233 filed in the Korean Intellectual Property Office on Feb. 15, 2016. The entire contents of the aforementioned applications are incorporated herein by reference.

BACKGROUND

(a) Field

The described technology relates to a computing device, a data transfer method between a coprocessor and a non-volatile memory, and a computer-readable recording medium.

(b) Description of the Related Art

Data processing coprocessors with high computation parallelism and comparatively low power consumption are becoming increasingly popular. One example of the coprocessor is a graphic processing unit (GPU). In such the coprocessor, many processing cores share execution control and can performing identical operations on numerous pieces of data via thread-level parallelism and data-level parallelism. A system using the coprocessor together with a central processing unit (CPU) can exhibit significant speedups compared to a CPU-only system.

The coprocessors can process more data than they have ever had before, and the volume of such data is expected. However, the coprocessors employ on-board memory whose size is relatively smaller compared to a host memory. The coprocessors therefore use a non-volatile memory connected to a host machine to process large sets of data.

However, the coprocessor and the non-volatile memory are completely disconnected from each other and are managed by different software stacks. Consequently, many redundant memory allocations/releases and data copies exist between a user-space and a kernel-space in order to read data from the non-volatile memory or write data to the non-volatile memory. Further, since a kernel module cannot directly access the user-space memory, memory management and data copy overheads between the kernel-space and the user-space are unavoidable. Furthermore, kernel-mode and user-mode switching overheads along with the data copies also contribute to long latency of data movements. These overheads causes the speedup improvement to be not significant compared to the coprocessor performance.

SUMMARY

An embodiment of the present invention provides a computing device, a data transfer method between a coprocessor and a non-volatile memory, and a computer-readable recording medium for reducing overheads due to a data movement between a coprocessor and a non-volatile memory.

According to an embodiment of the present invention, a computing device including a CPU, a CPU memory for the CPU, a non-volatile memory, a coprocessor using the non-volatile memory, a coprocessor memory, and a recording medium is provided. The coprocessor memory stores data to be processed by the coprocessor or data processed by the coprocessor. The recording medium includes a controller driver for the non-volatile memory and a library that are executed by the CPU. The controller driver maps the coprocessor memory to a system memory block of the CPU memory. The library moves data between the coprocessor and the non-volatile memory via the system memory block mapped to the coprocessor memory.

The system memory block may include a memory-mapped register and a pinned memory space mapped to the coprocessor memory. The memory-mapped register may be managed for the non-volatile memory by the controller driver and may include a plurality of entries for pointing addresses of the pinned memory space.

A start offset of the system memory block may be indicated by a base address register of an interface connecting the non-volatile memory with the CPU.

Each entry may point a logical block address of a space with a predetermined size in the pinned memory space, and the logical block address may be mapped to a physical block address of a space with a predetermined size in the coprocessor memory.

When the coprocessor reads data from the non-volatile memory, the controller driver may transfer the data from the non-volatile memory to the space of the physical block address that is mapped to the logical block address pointed by a corresponding entry.

The non-volatile memory may be connected to the CPU through a non-volatile memory express (NVMe) protocol, and each entry may be a physical region page (PRP) entry.

The non-volatile memory may be connected to the CPU through an advanced host controller interface (AHCI) protocol, and each entry may be a physical region descriptor table (PRDT) entry.

The library may reside above an application and a native file system in a software stack.

According to another embodiment of the present invention, a method of transferring data between a coprocessor and a non-volatile memory in a computing device is provided. The method includes mapping a coprocessor memory for the coprocessor to a system memory block of a CPU memory for a CPU, and moving data between the coprocessor and the non-volatile memory via the system memory block mapped to the coprocessor memory.

The system memory block may include a memory-mapped register and a pinned memory space mapped to the coprocessor memory. The memory-mapped register may be managed by a controller driver for the non-volatile memory and may include a plurality of entries for pointing addresses of the pinned memory space.

A start offset of the system memory block may be indicated by a base address register of an interface connecting the non-volatile memory with the CPU.

Each entry may point a logical block address of a space with a predetermined size in the pinned memory space, and the logical block address may be mapped to a physical block address of a space with a predetermined size in the coprocessor memory.

When the coprocessor reads data from the non-volatile memory, moving the data may include transferring the data from the non-volatile memory to the space of the physical block address that is mapped to the logical block address pointed by a corresponding entry.

The non-volatile memory may be connected to the CPU through a non-volatile memory express (NVMe) protocol, and each entry may be a physical region page (PRP) entry.

The non-volatile memory may be connected to the CPU through an advanced host controller interface (AHCI) protocol, and each entry may be a physical region descriptor table (PRDT) entry.

According to yet another embodiment of the present invention, a computer-readable recording medium is provided. The computer-readable recording medium stores a program to be executed by a computing device including a CPU, a CPU memory for the CPU, a non-volatile memory, a coprocessor using the non-volatile memory, and a coprocessor memory configured to store data to be processed by the coprocessor or data processed by the coprocessor. The program includes a controller driver for the non-volatile memory configured to map the coprocessor memory to a system memory block of the CPU memory, and a library configured to move data between the coprocessor and the non-volatile memory via the system memory block mapped to the coprocessor memory.

DETAILED DESCRIPTION OF THE EMBODIMENTS

Figure 1:
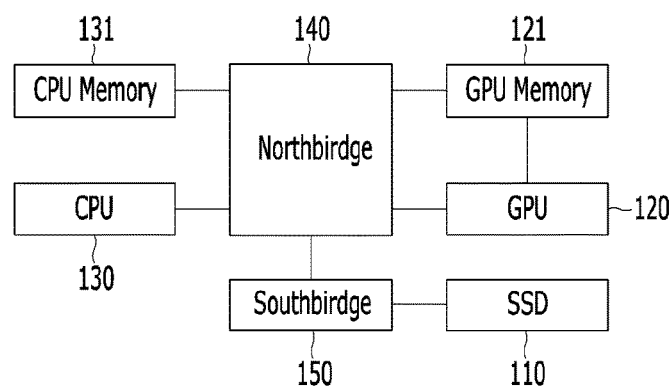
FIG. 1 schematically shows a computing device using a coprocessor and a non-volatile memory according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

The disclosure of the inventor's treatise, "NVMMU: A Non-Volatile Memory Management Unit for Heterogeneous GPU-SSD Architectures, in the 24th International Conference on Parallel Architectures and Compilation Techniques, PACT 2015, 2015" is herein incorporated by reference.

FIG. 1 schematically shows a computing device using a coprocessor and a non-volatile memory according to an embodiment of the present invention. FIG. 1 shows one example of the computing device, and the computing device according to an embodiment of the present invention may be implemented by use of various structures.

Referring to FIG. 1, a computing device according to an embodiment of the present invention includes a non-volatile memory 110, a coprocessor 120, and a CPU 130.

While it is described in an embodiment of the present invention that a graphic processing unit (GPU) and a solid state disk (SSD) are examples of the coprocessor 120 and the non-volatile memory 110, the present invention is not limited thereto. The coprocessor 120 may be a computer processor used to supplement functions of a primary processor such as a CPU. The non-volatile memory 110 may be, as a file input/output-based non-volatile memory, a computer memory that can retrieve stored information even after having been power cycled (turned off and back on).

The GPU 120 and the SSD 110 are connected to the CPU 130 via chipsets of a mainboard. The computing device may further include a northbridge 140 and a southbridge 150 to connect the GPU 120 and the SSD 110 with the CPU 130.

The GPU 120 may be connected to the northbridge 140 that locates at the CPU-side and access a GPU-side memory (hereinafter referred to as a "GPU memory") 121 via a high performance PCIe (peripheral component interconnect express) link. The SSD 110 may be connected to the southbridge 150 that locates at PCI slot-side on the mainboard via a PCIe link or a thin storage interface such as serial AT attachment (SATA). The northbridge 140 is also called a memory controller hub (MCH), and the southbridge 150 is also called an input/output controller hub (ICH).

Even though the GPU 120 and the SSD 110 can offer extremely high bandwidth compared with other external devices, they are considered like conventional peripheral devices from a CPU viewpoint. Therefore, the conventional computing devices use data transfer protocols between the peripheral devices to transfer data between the GPU 120 and the SSD 110. That is, the conventional computing devices can transfer the data between the CPU 130 and the GPU 120 and/or between the CPU 130 and the SSD 110 through a memory copy technique, but cannot directly forward the date between the GPU 120 and the SSD 110. The computing device further includes a CPU-side memory (hereinafter referred to as a "CPU memory") 131 corresponding to a system memory for the copy on the CPU 130. For example, the CPU memory 131 may be a random access memory (RAM), particularly a dynamic RAM (DRAM).

In some embodiments, a system including the CPU 130, the CPU memory 131, the northbridge 140, and the southbridge 150 may be called a host machine.

First, a data movement between a GPU and an SSD 110 in a conventional computing device is described with reference to FIG. 2 to FIG. 5.

Figure 2:
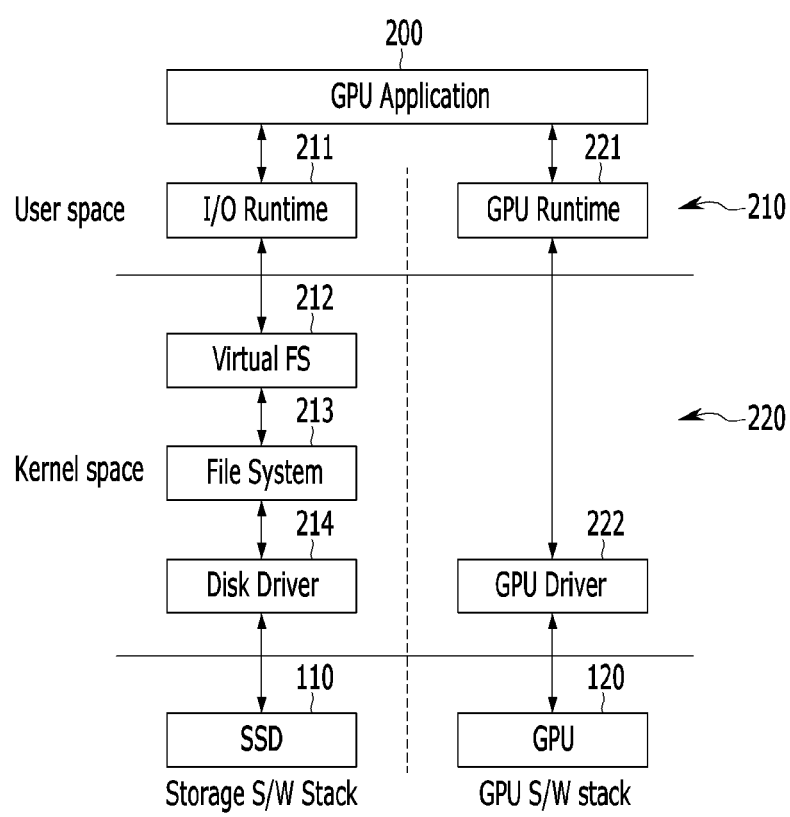
FIG. 2 schematically shows a software stack for a GPU and an SSD in a conventional computing device.

FIG. 2 schematically shows a software stack for a GPU and an SSD in a conventional computing device.

Referring to FIG. 2, the software stack for the GPU 120 and the SSD 110 in the conventional computing device may be divided into a user space 210 and a kernel space 220. The user space 210 operates on a user-level CPU and may be a virtual memory area on which an operating system (OS) executes an application (for example, a GPU application) 210. The kernel space 220 operates on a kernel-level CPU and may be a virtual memory area for running an OS kernel and a device driver.

Because of the different functionalities and purposes of the GPU 120 and the SSD 110, there are two discrete libraries, i.e., an input/output (I/O) runtime library 211 and a GPU runtime library 221 which coexist on the same user space 210 and are both utilized in the GPU application 200.

The software stack may be divided into a storage software stack for the SSD 110 and a GPU software stack for the GPU 120. SSD accesses and file services are managed by modules on the storage software stack and GPU-related activities including memory allocations and data transfers are managed by modules on the GPU software stack.

In the storage software stack, when the GPU application 200 calls I/O runtime library 211 through an interface, for example a POSIX (portable operating system interface), the I/O runtime library 211 stores user-level contexts and jumps to a virtual file system (VFS) 212. The virtual file system 212 is a kernel module in charge of managing standard file system calls. The file system 212 selects an appropriate native file system 213 and initiates a file I/O request. Next, the native file system 213 checks an actual physical location associated with the file I/O request, and composes a block level I/O service transaction by calling another function pointer that can be retrieved from a block-device-operation data structure. Finally, a disk driver 214 issues the I/O request to the SSD 110. For example, the disk driver 214 may issue the I/O request to the SSD 110 through a PCIe or AHCI (advanced host controller interface) controller. When the I/O service is completed, target data are returned to the GPU application 200 via the aforementioned modules 211, 212, 213, and 214, but in reverse order.

In the GPU software stack, a GPU runtime library 221 is mainly responsible for executing a GPU-kernel and copying data between the CPU memory 131 and the GPU memory 121. Differently from the storage software stack, the GPU runtime library 221 creates a GPU command at the user level and directly submits the GPU command with the target data to a kernel-side GPU driver 222. Depending on the GPU command, the GPU driver 222 maps a kernel memory space, i.e., the CPU memory 131 to the GPU memory 121 or translates an address to a physical address of the GPU memory 121. When the address translation or mapping is completed, the GPU 120 facilitates a data movement between the CPU memory 131 and the GPU memory 121.

Next, a GPU programming model on the software stack is described with reference to FIG. 3.

Figure 3:
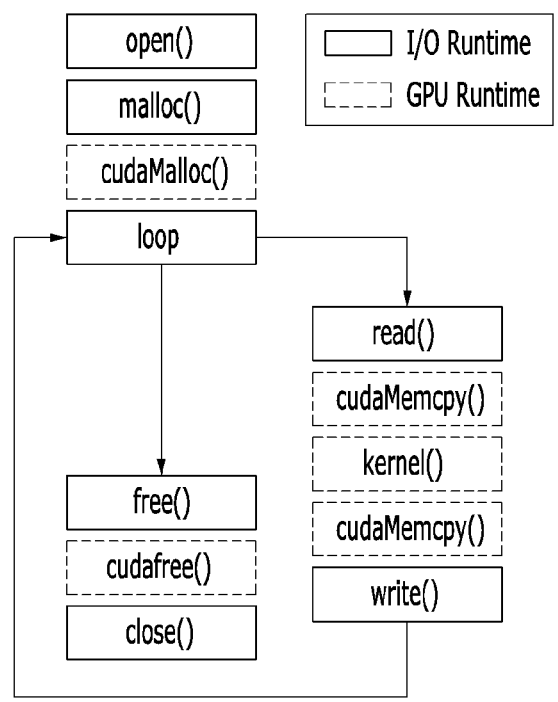
FIG. 3 schematically shows a GPU programming model on a software stack in a conventional computing device.

FIG. 3 schematically shows a GPU programming model on a software stack in a conventional computing device.

Referring to FIG. 3, the GPU application 200 first opens a file descriptor for read/write through an open( ) function. The GPU application 200 then allocates a virtual user memory to the CPU memory 131 through a malloc( ) function in order to reads data from the SSD 110 or write data to the SSD 110. Further, the GPU application 200 allocates the GPU memory 121 for data transfers between the GPU 110 and the CPU 130 through a cudaMalloc( ) function. Next, the GPU application 200 calls an I/O runtime library API by specifying the file descriptor and the address of the GPU memory 121 as prepared in the previous steps through a read( ) function. Once the target data is brought into the CPU memory 131 from the SSD 110, the GPU application 200 initiates the data transfer from the CPU memory 131 to the GPU memory 121 through a cudaMemcpy( ) function, and executes the GPU kernel through a kernel( ) function by calling the GPU runtime library with a specific number of threads and memory address pointers. In a case where the GPU application 200 needs to store a result generated by the GPU 120, the GPU application 200 may copy the result data to the virtual user memory of the CPU memory 131 from the GPU memory 121 through a cudaMemcpy( ) function, and sequentially write the data to the SSD 110 through a write( ) function. These processes may be repeated multiple times (loop). After all the processes are completed, the GPU application 200 cleans up the CPU memory and GPU memory allocations [cudafree( )] and the file descriptor [close( )].

Next, a procedure in which the GPU application 200 transfers data between the GPU 120 and the SSD 110 is described with reference to FIG. 4.

Figure 4:
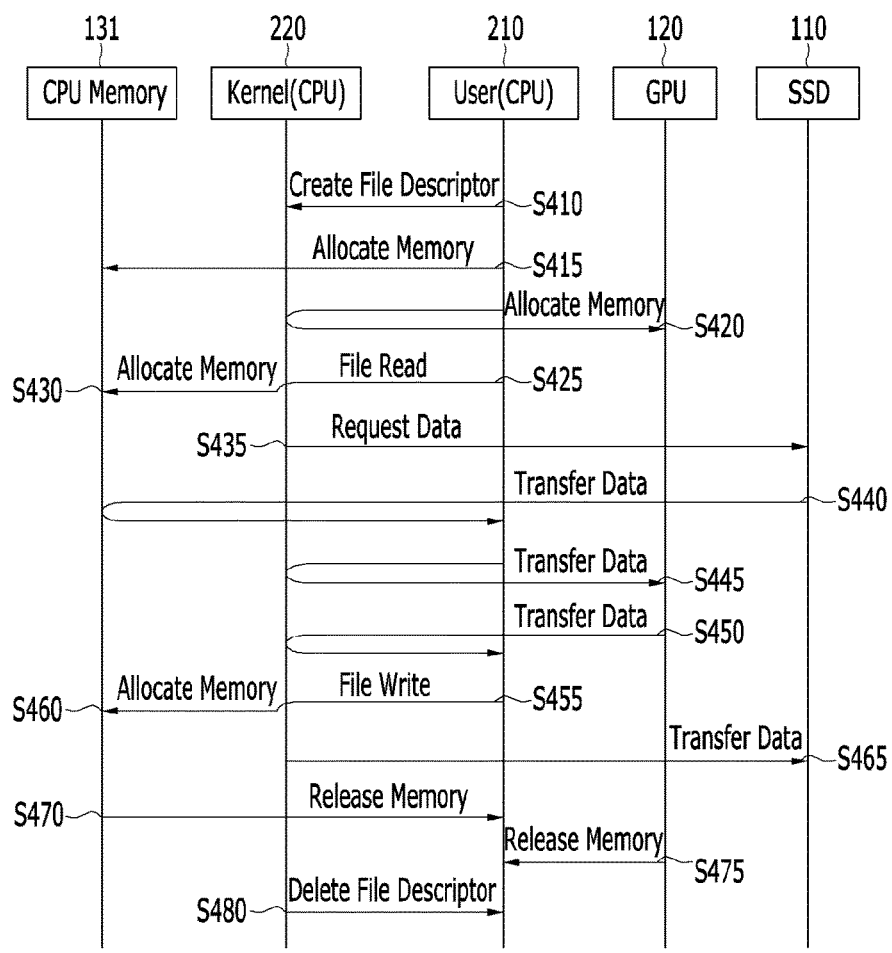
FIG. 4 schematically shows a data movement between a GPU and an SSD in a conventional computing device.

FIG. 4 schematically shows a data movement between a GPU and an SSD in a conventional computing device.

Referring to FIG. 4, the GPU application 200 creates on a kernel a file descriptor for a read and/or a write (S410). The GPU application 200 then allocates a virtual user memory to the CPU memory 131 for reading data from the SSD 110 or writing data to the SSD 110 (S415). The GPU application 200 allocates GPU memory 121 for writing data to the GPU 120 or reading data from the GPU 120 (S420).

The GPU application 200 then requests a file read to for the SSD 110 (S425). The kernel space 220 allocates a physical memory to the CPU memory 131 and copies data for the file read from the virtual user memory to the physical memory (S430), and request file data for the SSD 110 (S435). Then, the file data are transferred from the SSD 110 to the CPU memory 131, i.e., the physical memory of the CPU memory 131, and the file data are copied from the physical memory of the CPU memory 131 to the virtual user memory (S440). The GPU application 200 then transfers the file data from the CPU memory 131 to the GPU memory 121 (S445). Consequently, the GPU 120 processes the file data.

In a case where the GPU application 200 needs to store a result that the GPU 120 has generated after processing the file data, the GPU application 200 transfers the result data from the GPU memory 121 to the virtual user memory of the CPU memory 131 (S450). The GPU application 200 then requests a file write for the SSD 110 (S455). The kernel space 220 allocates a physical memory to the CPU memory 131 and copies the result data from the virtual user memory to the physical memory (S460), and transfers the result data from the physical memory of the CPU memory 131 to the SSD 110 (S465).

After completing all the processes, the GPU application 200 releases the virtual user memory of the CPU memory 131 allocated for the read and/or write (S470), and releases the GPU memory 121 allocated for the write and/or read (S475). Further, the GPU application 200 deletes the file descriptor created for the read and/or write in the kernel (S480).

In FIG. 4, the steps S410, S415, S425, S430, S435, S455, S460, and S465 may be processes associated with the I/O runtime library, and the steps S420 and S445 may be processes associated with the GPU runtime library. The steps S440, S470, and S480 may be responses of devices for the storage software stack, i.e., the SSD 110 and CPU memory 131, and the step S450 and S475 may be responses of the GPU 120.

Figure 5:
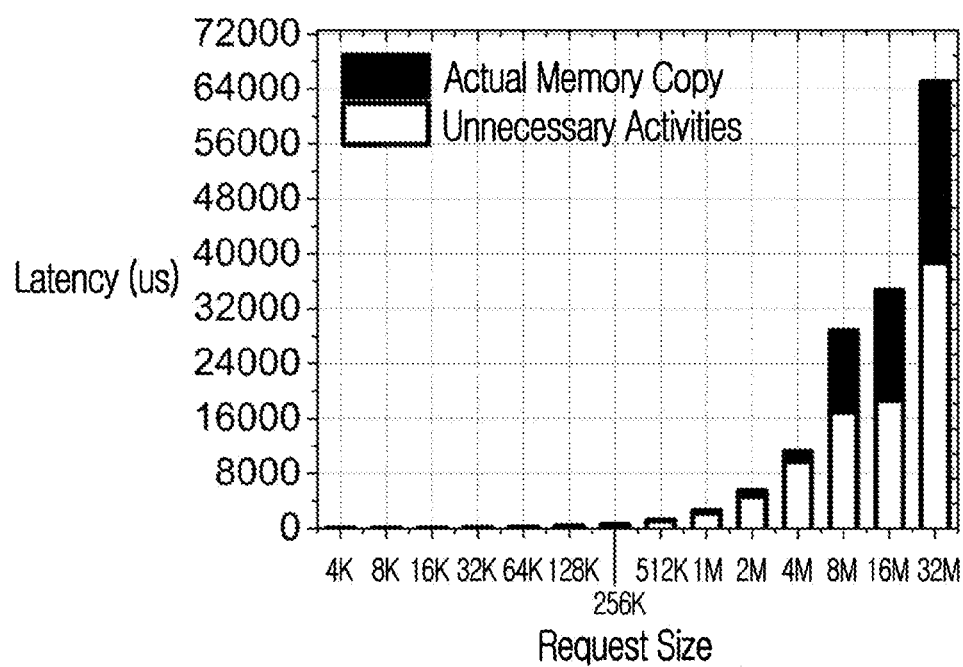
FIG. 5 shows performance degradation in a conventional computing device.

As such, the application working on the user-level CPU needs to request the I/O or memory operations from the underlying kernel-level modules. Once the modules are done with the file-related operations, a disk driver exchanges the file data between the SSD 110 and the GPU 120, using the CPU memory 131 as an intermediate storage. In this case, as shown in FIG. 5, the numerous hops can make overheads according to a data movement among the GPU 120, the CPU 130, and the SSD 110, and further make unnecessary activities, for example communication overheads, redundant data copies, and CPU intervention overheads. These may take as much as 4.21 times and 1.68 times, respectively, of CPU execution time taken by the GPU 120 and the SSD 130. Accordingly, the processing speed of the GPU 120 that can offer high bandwidth through the parallelism may be slowed down.

Data transfer protocols for reducing the data movement overheads between the GPU 120 and the SSD 110 that can occur in the conventional computing device are being developed. GPUDirect™ is one of the protocols.

GPUDirect™ supports a direct path for communication between the GPU and a peer high performance device using a standard PCIe interface. GPUDirect™ is typically used to handle peer-to-peer data transfers between multiple GPU devices. Further, GPUDirect™ offers non-uniform memory access (NUMA) and remote direct memory access (RDMA), which can be used for accelerating data communication with other devices such as a network device and a storage device. While GPUDirect™ can be used for managing the GPU memory in transferring a large data set between the GPU and the SSD, it has shortcomings: i) all the SSD and GPU devices should use PCIe and should exist under the same root complex, ii) GPUDirect™ is incompatible with the aforementioned data transfer protocol in the conventional computing device, and iii) file data accesses should still pass through all the components in the storage software stack.

Further, there are protocols such as non-volatile memory express (NVMe) and advance host controller interface (AHCI) as the protocols for the interface.

The NVMe is a scalable and high performance interface for a non-volatile memory (NVM) system and offers an optimized register interface, command, and feature sets. The NVMe can accommodate standard-sized PCIe-based SSDs and SATA express (SATAe) SSDs connected to either the northbridge or the southbridge. As a consequence, the NVMe does not require the SSD and GPU to exist under the same root complex like what GPUDirect requires. While the NVMe is originally oriented towards managing data transfers between the CPU and the SSD, an embodiment of the present invention may allow a system memory block of the NVMe, referred to as a physical page region (PRP) to be shared by the SSD 110 and the GPU 120.

The AHCI is an advanced storage interface that employs both SATA and PCIe links in the southbridge. The AHCI defines a system memory structure which allows the OS to move data from the CPU memory to the SSD without significant CPU intervention. Unlike traditional host controller interfaces, the AHCI can expose high bandwidth of the underlying SSD to the northbridge controller through direct media interface (DMI) that shares many characteristics with PCIe. Further, a system memory block of the AHCI is pointed by a physical region descriptor (PRD) whose capabilities are similar to those of the PRP. Accordingly, an embodiment of the present invention may allow the system memory block of the AHCI to be shared by the SSD 110 and the GPU 120.

Hereinafter, a data transfer method according to an embodiment of the present invention is described with reference to FIG. 6 to FIG. 11.

In the above-described conventional computing device, there is a problem that the SSD and the GPU are completely disconnected from each other and are managed by different software stacks. Accordingly, many redundant memory allocations/releases and data copies exist between the user space and the kernel space on the SSD and GPU system stacks. Further, since the kernel module cannot directly access the user space, the memory management and data copy overheads between the kernel space and the user space are unavoidable. Furthermore, the kernel mode and user mode switching overheads along with the data copies contribute to long latency of the data movements.

Figure 6:
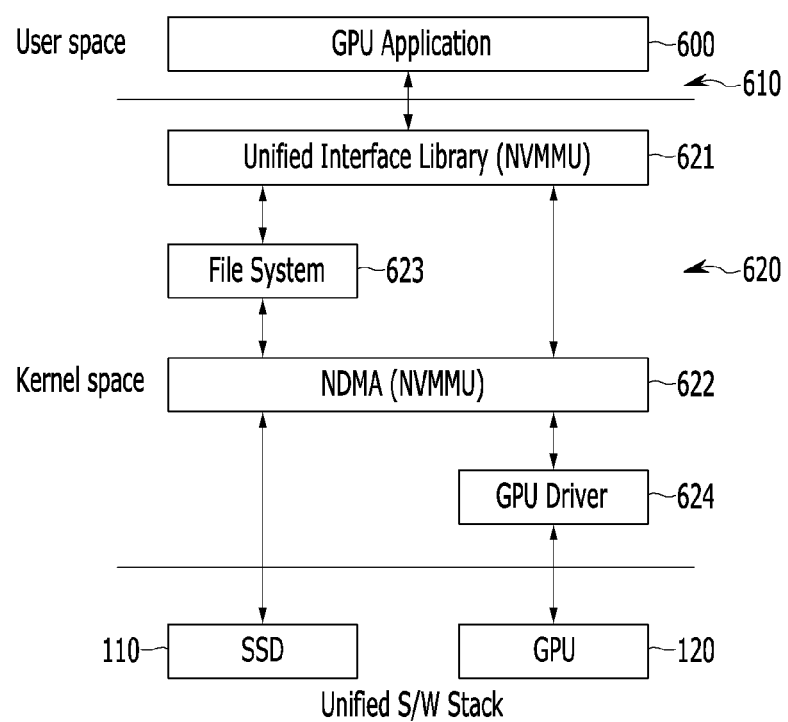
FIG. 6 schematically shows a software stack for a GPU and an SSD in a computing device according to an embodiment of the present invention.

FIG. 6 schematically shows a software stack for a GPU and an SSD in a computing device according to an embodiment of the present invention.

Referring to FIG. 6, in a computing device according to an embodiment of the present invention, a software stack for a GPU 120 and an SSD 110 may be divided into a user space 610 and a kernel space 620. The user space 610 operates on a user-level CPU and may be a virtual area on which an OS executes an application (for example, a GPU application) 600. The kernel space 620 operates on a kernel-level CPU and may be a virtual memory area for running an OS kernel and a device driver.

A GPU software stack and an SSD software stack are unified via kernel components in the kernel space. The kernel components include a library 621 and a controller driver 622. In some embodiments, the library 621 and controller driver 622 may be collectively referred to as a non-volatile memory management unit (NVMMU). In some embodiments, the NVMMU may be a program to be executed by the CPU 130, which may be stored in a computer-readable recording medium. In some embodiments, the computer-readable recording medium may be a non-transitory recording medium.

In some embodiments, the library 621 may be referred to as a unified interface library (UIL) because it is an interface library for unifying the SSD software stack and the GPU software stack. In some embodiments, the controller driver 622 may be referred to as a non-volatile direct memory access (NDMA) because it makes a coprocessor directly access a non-volatile memory. Hereinafter, the library 621 and the controller driver 622 are referred to as the ULI and the NDMA, respectively, for convenience.

The UIL 621 may be a virtual file system driver for directly transferring data between the SSD 110 and the GPU 120. The UIL 621 directly transfers target data from the SSD 110 to a GPU memory 121 or from the GPU memory 121 to the SSD 110 via a system memory block (kernel buffer) mapped to the GPU memory 121. In some embodiments, the UIL 621 may reside on top of a native file system and may read/write target file contents from the native file system via the system memory block. That is, the UIL 621 may handle a file access and a memory buffer that the NDMA 622 provides by overriding a conventional virtual file system switch.

As a consequence, the UIL 621 can remove the unnecessary user mode and kernel mode switching overheads between the user space and the kernel space. Further, the UIL 621 may not use a user-level memory and may not copy the data between the user space and the kernel space during the data movement between the GPU 120 and the CPU 130.

The NDMA 622 may be a control driver which modifies a disk controller driver that manages a file read/write of the SSD 110. The NDMA 622 manages a physical memory mapping which is shared by the SSD 110 and the GPU 120 for the data movement between the SSD 110 and the GPU 120. That is, the NDMA 622 manages a memory mapping between the GPU memory 121 and the system memory block. The mapped system memory block may be exposed to the UIL 621. The UIL 621 may recompose user data of an I/O request using the system memory block if the I/O request is related to a data transfer between the GPU 120 and the SSD 110. Otherwise, the UIL 621 may bypass the I/O request to the underlying kernel module (i.e., the native file system).

A mapping method in the NDMA 622 may be reconfigured based on an interface or controller employed (for example, NVMe or AHCI). The mapping method in the NDMA 622 is described using various interfaces or controllers.

First, an example of an NVMe SSD is described with reference to FIG. 7.

Figure 7:
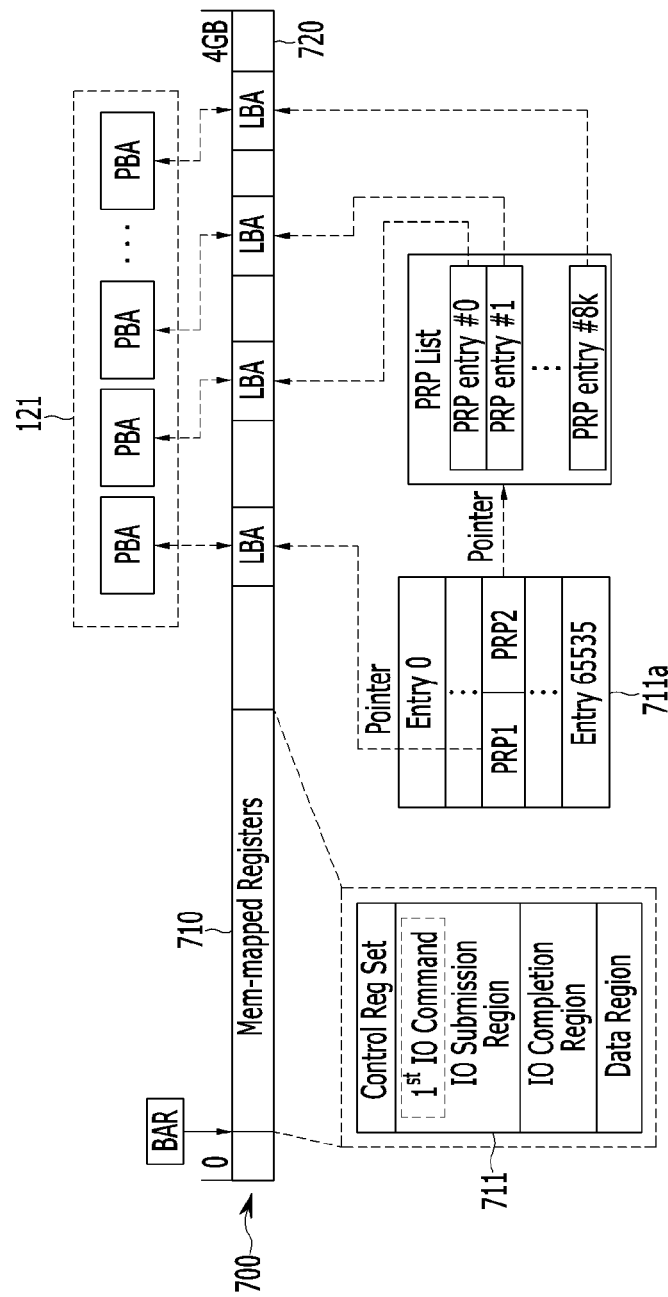
FIG. 7 schematically shows a data movement between an SSD and a GPU through an NVMe protocol in a computing device according to an embodiment of the present invention.

FIG. 7 schematically shows a data movement between an SSD and a GPU through an NVMe protocol in a computing device according to an embodiment of the present invention.

Referring to FIG. 7, an NDMA 622 uses a system memory block 700 mapped to a GPU memory 121. The system memory block 700 is a kernel buffer allocated to a CPU memory 131, and includes a memory-mapped register 710 and a GPU pinned memory space 720. The memory-mapped register 710 is a register which a disk driver controller (for example, an NVMe controller) for an SSD 110 manages, and the GPU pinned memory space 720 is a space mapped to the GPU memory 121.

The memory-mapped register 710 includes I/O submission queues (an I/O submission region) 711 of the NVMe SSD 110, and a start offset of the memory-mapped register 710 may be indicated by a baseline address register (BAR) of the PCIe. A submission command 711a may be input to the I/O submission queue 711, and the submission command 711a may have various items. Each item may have two physical region pages (PRPs), a PRP1 entry and a PRP2.

Each of the PRP1 entry and PRP2 entry points a physical page of the GPU memory 121 for the data movement between the SSD 110 and the GPU 120. In some embodiments, the NDMA 622 may map block addresses of the GPU pinned memory 720 to block addresses of the GPU memory 121 in the system memory block 700. In this case, each of the PRP1 entry and PRP2 entry may map point a logical block address (LBA) mapped to a space (i.e., a memory block) with a predetermined size in the GPU pinned memory 720. The logical block address is a device-visible virtual address and indicates a predetermined space in the system memory block 700. Then, an address, i.e., a physical block address (PBA) of the space with the predetermined size in the GPU memory 121, which is mapped to the logical block address can be automatically pointed.

In some embodiments, the PRP1 entry may directly point the memory block of the system memory block 700 and the PRP2 entry may point a PRP list. The PRP list may include one or more PRP entries, each pointing the memory block. In this case, each PRP entry may point the memory block with a predetermined size, for example the memory block with 4 KB. In a case where the amount of data to be transferred between the SSD 110 and the GPU 120 is greater than 4 KB, they may be referred by the pointers on the PRP list which is indicated by the PRP2 entry.

Accordingly, when data are transferred from the GPU 120 to the SSD 110, the NDMA 622 generates the PRP1 entry for pointing the logical block address of the system memory block 700, which is mapped to the GPU memory 121 including the data to be transferred to the SSD 110. In a case where the amount of data to be transferred to the SSD 110 is greater than 4 KB, the NDMA 622 generates the PRP entries for pointing the logical block addresses of the system memory block 700, which are mapped to the GPU memory 121 including the remaining data, and generates the PRP2 entry for pointing the PRP list including these PRP entries. Since the NDMA 622 exports such the allocated memory spaces to the UIL, it can directly move the data from the GPU memory 121 to the SSD 110.

Similarly, when data are transferred from the SSD 110 to the GPU 120, the NDMA 622 generates the PRP1 entry for pointing the logical block address of the system memory block 700, which is mapped to the GPU memory 121 for writing the data to be transferred to the GPU 120. In a case where the amount of data to be transferred to the GPU 120 is greater than 4 KB, the NDMA 622 generates the PRP entries for pointing the logical block addresses of the system memory block 700, which are mapped to the GPU memory 121 for writing the remaining data, and generates the PRP2 entry for pointing the PRP list including these PRP entries. Since the NDMA 622 exports such the allocated memory spaces to the UIL, it can directly move the data from the SSD 110 to the GPU memory 121.

In some embodiments, the memory-mapped register 710 may further include a control register set above the I/O submission region 711. The control register set may start from the BAR. The control register set may be used for managing an NVMe work such as updating a doorbell register and interrupt management. The memory-mapped register 710 may further include I/O completion queues (an I/O completion region) below the I/O submission region 711 and a data region below the I/O completion region.

In this case, the GPU application 600 notifies the disk driver controller of the submission command using the doorbell register of the control register set, and the disk driver controller brings the submission command of the I/O submission queue and processes it. The submission command including the PRP entries may be transferred to the disk drive controller and be used for the read/write of the SSD 110. Accordingly, the disk drive controller can transfer the data of the SSD 110 to the GPU memory 121 pointed by the PRP entries of the item in the submission command or transfer the data of the GPU memory 121 pointed by the PRP entries to the SSD 110.

Since the pre-allocated memory space is exported to the UIL 621, the NDMA 622 can directly upload or download the GPU data while letting the other kernel components serve a file-related work such as LBA translation in an appropriate manner Since the kernel buffers of the NDMA 622 are managed as a pre-allocated memory pool, they may not be released until all data movement activities involving the file data are over. To implement this, an interrupt service routine (ISR) registered at a driver's NVMe initialization time may be modified.

Next, an example of an AHCI SSD is described with reference to FIG. 8. Compared with the NVMe, the AHCI has a different data management structure but employs a similar strategy for the data transfer between the GPU and the SSD.

Figure 8:
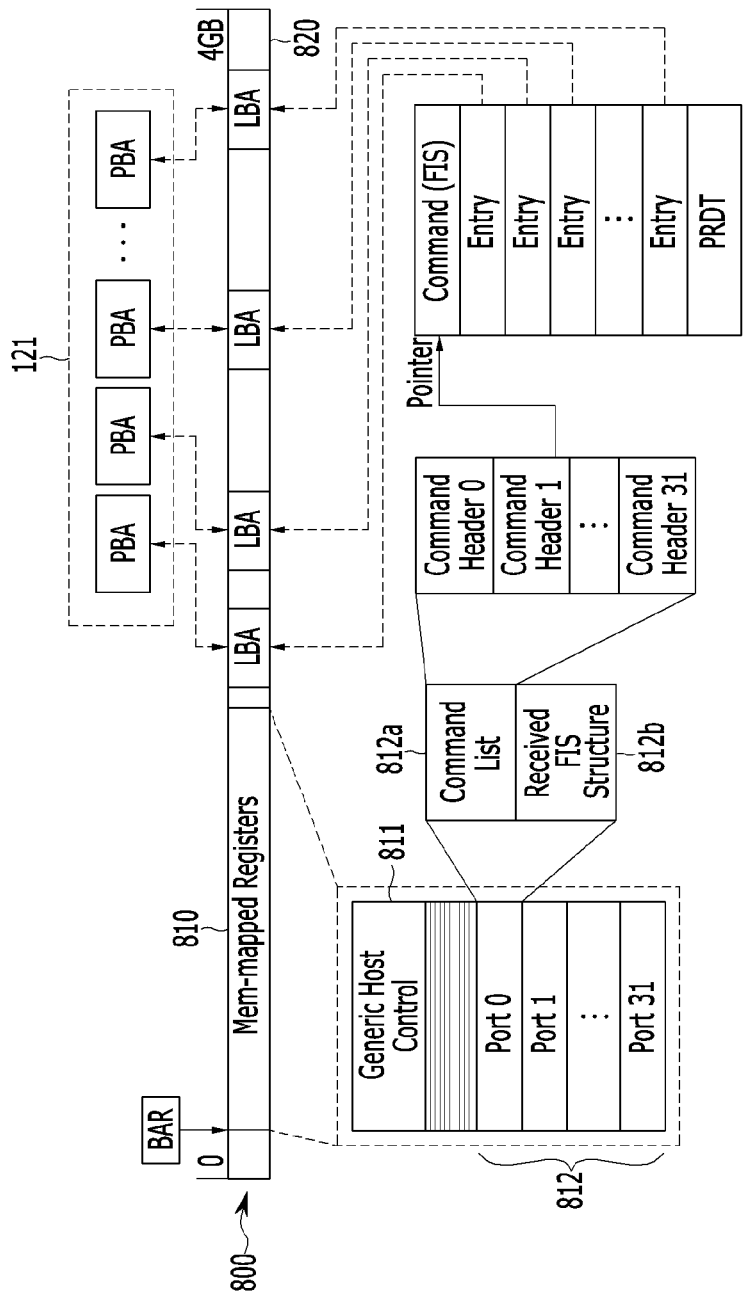
FIG. 8 schematically shows a data movement between an SSD and a GPU through an AHCI protocol in a computing device according to an embodiment of the present invention.

FIG. 8 schematically shows a data movement between an SSD and a GPU through an AHCI protocol in a computing device according to an embodiment of the present invention.

Referring to FIG. 8, an NDMA 622 uses a system memory block 800 mapped to a GPU memory 121. The system memory block 800 is a kernel buffer allocated to a CPU memory 131, and includes a memory-mapped register 810 and a GPU pinned memory space 820. The memory-mapped register 810 is a register which a disk driver controller (for example, an AHCI controller) for an SSD 110 manages, and the GPU pinned memory space 820 is a space mapped to the GPU memory 121.

The memory-mapped register 810 includes a generic host control 811 and multiple port registers 812, and a start offset of the memory-mapped register 810 may be indicated by an AHCI base address register (ABAR). The multiple port registers 812 indicate a plurality of ports, and each port may represent an individual SSD in an SDD array. The multiple port registers 812 includes two meta-data structures 812a and 812b for each port. The two meta-data structures 812a and 812b includes a command list 812a and a received FIS (frame information structure) structure 812b. The command list 812a includes a plurality of command headers, for example 32 command headers. The received FIS 812b is used for handshaking control such as a device-to-host (D2H) acknowledge FIS, and each command header refers to a physical region descriptor table (PRDT).

There are a plurality of entries, for example 65536 entries in the PRDT, and each PRDP entry points a system memory block managed by the NDMA 622. Each PRDP entry may point a logical block address corresponding to addresses of the GPU pinned memory 820.

In the AHCI, a maximum buffer size of each PRDT entry may be 4 MB. In some embodiments, the buffer may be split into multiple physical pages with a predetermined size (for example, multiple 4 KB physical pages) to make them compatible with a PRP management policy employed by the GPU 120. As a direct media interface (DMI) of the AHCI shares physical characteristics of the PCIe links, interrupts delivered by the FIS are converted to a PCIe interrupt packet which allows the NDMA 622 to manage an interrupt service routine (ISR) in a similar fashion to what is done in the NVMe.

Figure 9:
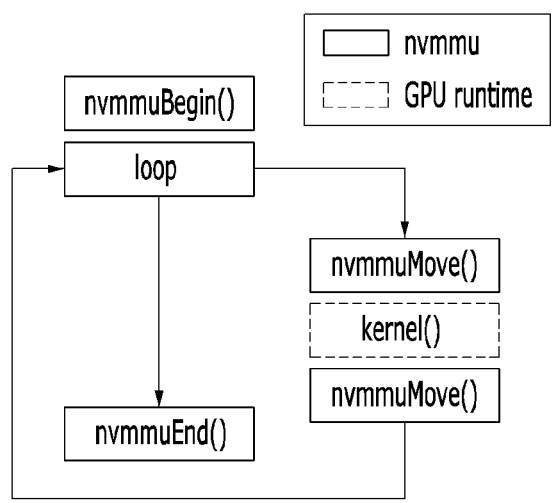
FIG. 9 schematically shows a GPU programming model on a software stack of a computing device according to an embodiment of the present invention.

FIG. 9 schematically shows a GPU programming model on a software stack of a computing device according to an embodiment of the present invention.

Referring to FIG. 9, a GPU application 200 creates a file descriptor for initializing an UIL 621 and an NDMA 622. The GPU application 200 may use, for example, an nvmmuBegin( ) function as the file descriptor to initialize the UIL 621 and NDMA 622.

A thread ID (tid) of a requester and a file name (w_filename) to be moved may be, as parameters, input to the nvmmuBegin( ) function like nvmmuBegin(tid, w_filename). The nvmmuBegin( ) function may keep the thread id (tid) of the requester for internal resource management, and may send piggyback information about parity block pipelining before starting the movement of the file data.

The GPU application 200 allocates a GPU memory 121 for read/write of data. For this, the GPU application 200 may use, for example, a cudaMalloc( ) function. In a case of the write, an address (&pGPUInP2P) of the GPU memory for writing the data and an amount (nImageDataSize) of the data to be written may be, as parameters, input to the cudaMalloc( ) function like cudaMalloc(&pGPUInP2P, nImageDataSize). In a case of the read, an address (&pGPUOutP2P) of the GPU memory for reading the data and an amount (nImageDataSize) of the data to be read may be, as parameters, input to the cudaMalloc( ) function like cudaMalloc (&pGPUOutP2P, nImageDataSize).

After allocating the GPU memory 121, the GPU application 200 moves data by specifying a file name, an offset, and a number of bytes (length) of the data to be transferred from the SSD 110 to the GPU 120. The GPU application 200 may call, for example, a nvmmuMove( ) function for the data movement. The nvmmuMove( ) function may create a data path between the SSD 110 and the GPU 120 based on the allocated addresses of the GPU memory 121 and the PRP entries pointing the addresses of the GPU memory 121, and may move the data taking into account the file name, the offset, and the amount of data. The file name (r_filename) of the data, the address (pGPUInP2P) of the GPU memory 121 for writing the data, offset 0, the amount of data (nImageDataSize), and a data movement direction (D2H) may be, as parameters, input to the nVmmuMove( ) function like nVmmuMove(r_filename, pGPUInP2P, 0, nImageDataSize, D2H). The D2H parameter indicates a device-to-host direction, i.e., the data movement from the SSD 110 to the GPU 120.

Once the target data are moved from the SSD 110 to the GPU memory 121, the GPU application 200 executes a GPU kernel. For executing the GPU kernel, the GPU application 200 may call, for example, a kernel( ) function.

Next, when the GPU application 200 needs to store a result generated by the GPU 120, the GPU application 200 moves the result data by specifying a file name, an offset, and the number of bytes (length) of the data to be transferred from the GPU 120 to the SSD 110. The GPU application 200 may call, for example, a nvmmuMove( ) function for the data movement. The file name (r_filename) of the data, the address (pGPUOutP2P) of the GPU memory 121 for reading the data, offset 0, the amount of data (nImageDataSize), and a data movement direction (H2D) may be, as parameters, input to the nVmmuMove( ) function like nVmmuMove (r_filename, pGPUOutP2P, 0, nImageDataSize, H2D). The D2H parameter indicates a host-to-device direction, i.e., the data movement from the GPU 120 to the SSD 110.

After all of the processes are completed, the GPU application 200 cleans up resources which the UIL 621 and the NDMA 622 use for the thread. The GPU application 200 may clean up the resources through, for example, an nvmmuEnd( ) function. The thread ID (tid) may be, as a parameter, input to the nvmmuEnd( ) function like nvmmuEnd(tid).

Figure 10:
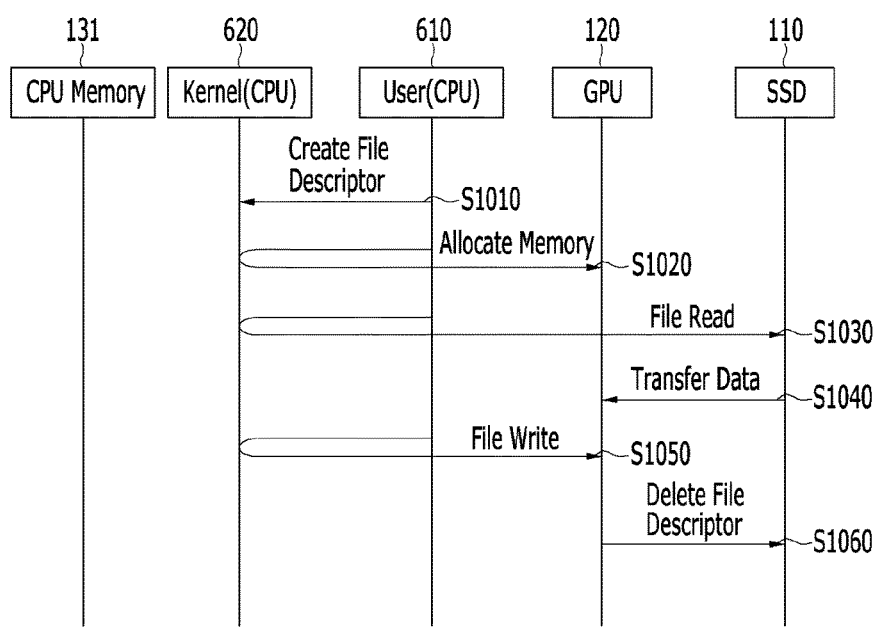
FIG. 10 schematically shows a data movement between a GPU and an SSD in a computing device according to an embodiment of the present invention.

FIG. 10 schematically shows a data movement between a GPU and an SSD in a computing device according to an embodiment of the present invention.

Referring to FIG. 10, a GPU application 200 creates on a kernel a file descriptor for a read and/or a write (S1010). The GPU application 200 then allocates a GPU memory 121 for writing data to the GPU 120 or reading data from the GPU 120 (S1020). Accordingly, physical block addresses of the allocated GPU memory 121 are mapped to logical block addresses of a system memory block associated with addresses of the SSD 110

The GPU application 200 requests a file read to for the SSD 110 (S1030). Then, the file data are transferred from the SSD 110 to the GPU memory 121 through mappings of the system memory block (S1040). Consequently, the GPU 120 processes the file data.

In a case where the GPU application 200 needs to store a result that the GPU 120 has generated after processing the file data, the GPU application 200 requests a file write for the GPU 120 (S1050). Then, the file data are transferred from the GPU memory 121 to the SSD 110 through mappings of the system memory block (S1060).

In FIG. 10, the steps S1010, S1020, S1030 and, S1050 may be processes associated with NVMMU. The step S1040 may be a response of the SSD 110, and the step S1060 may be a response of the GPU 120.

In some embodiments, a data transfer method described above may be applied to a redundant array of independent disks (RAID)-based SSD array. For the RAID-based SSD array, a software-based array controller driver may be modified to abstract multiple SSDs as a single virtual storage device. Since a GPU has neither an OS nor resource management capabilities, a host-side GPU application may in practice have all of the information regarding file data movement, such as a target data size, a file location, and timing for data download prior to beginning GPU-kernel execution. The nvmmuBegin( ) function may pass a file name to be downloaded from the SSD 110 to the UIL 621, and the UIL 621 may feed this information to an array controller driver, i.e., the NDMA 622. Then, the array controller driver may read an old version of the target file data and the corresponding parity blocks at an early stage of GPU body code-segments using the information. Consequently, the array controller driver may load the old data and prepare new parity blocks while the GPU 120 and the CPU 130 prepare for a data movement and execution of the GPU kernel. This parity block pipelining strategy can enable all parity block preparations to be done in parallel with performing a data movement between the GPU 120 and the CPU 130 and/or executing GPU-kernel. Accordingly, performance degradation exhibited by conventional RAID systems can be eliminated.

As described above, according to an embodiment of the present invention, since data can be directly moved between the GPU and the SSD without significant CPU intervention, redundant data copies according to virtual memory allocation of the CPU memory can be reduced, and overheads due to the copies and switching between the user mode and the kernel mode for the copies can be reduced. Accordingly, application execution times through the GPU can be reduced, and the data movement overheads can be reduced.

Since file-associated GPU operations are implemented as a virtual file system extension, a UIL-assisted GPU application can be complied just like a normal GPU program and then no compiler modification is required. Further, the computing device can still use all functionality of I/O runtime and GPU runtime libraries, which means that the NVMMU is fully compatible with all existing GPU applications.

Next, performance improvement of an NVMMU according to an embodiment of the present invention is described with reference to FIG. 11 and FIG. 12.

Figure 11:
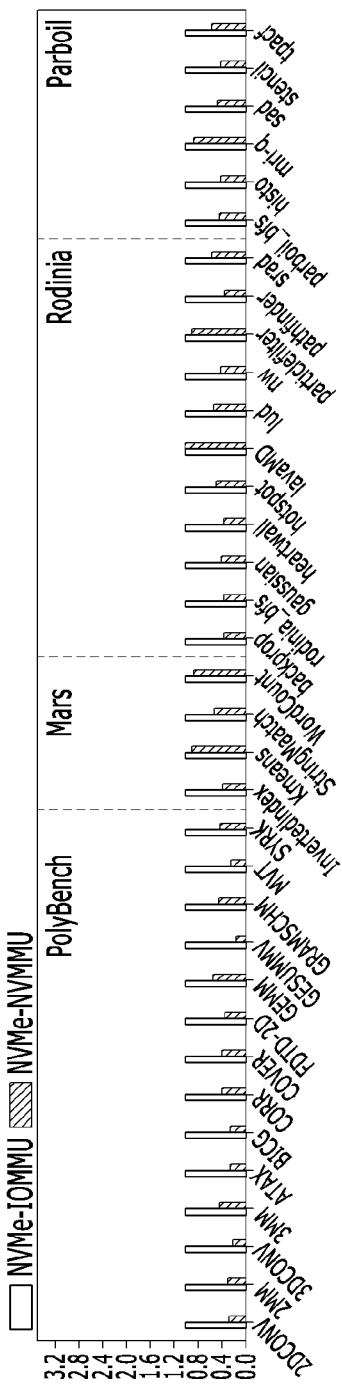
FIG. 11 shows latency values in transferring file data for a GPU application.
Figure 12:
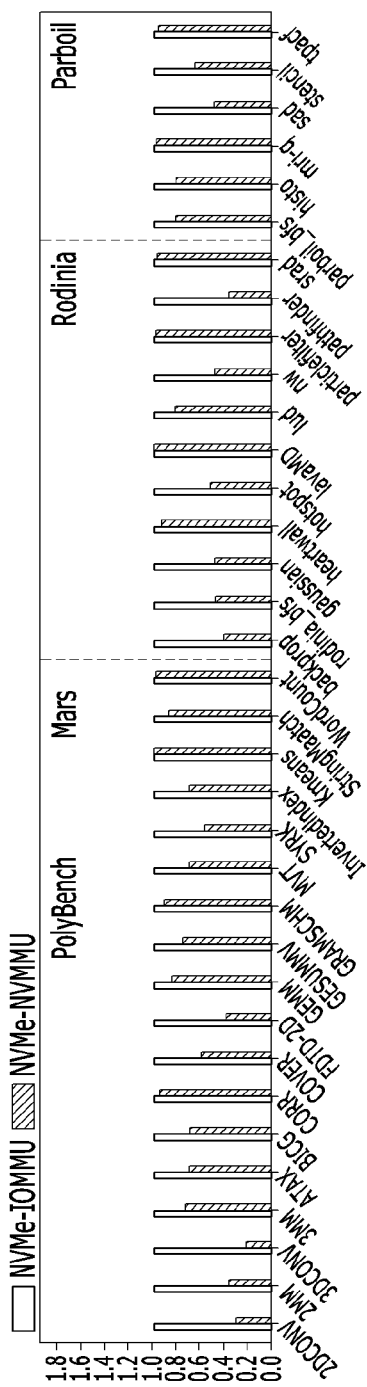
FIG. 12 shows execution times of a GPU application.

FIG. 11 shows latency values in transferring file data for a GPU application, and FIG. 12 shows execution times of a GPU application.

As shown in FIG. 11, it is noted that an NVMMU using an NVMe protocol (hereinafter referred to as an "NVMe-NVMMU") reduces latency values of data movement, compared to an NVMe-IOMMU, by 202%, 70%, 112% and 108%, for PolyBench, Mars, Rodinia and Parboil benchmarks, respectively. The NVMe-IOMMU means a memory management unit that uses an NVMe protocol in a conventional computing device as described with reference to FIG. 2 to FIG. 5. As shown in FIG. 12, it is noted that the NVMe-NVMMU reduces the application execution times, compared to the NVMe-IOMMU, by 192%, 14%, 69% and 37%, for PolyBench, Mars, Rodinia and Parboil benchmarks, respectively.

These performance improvements can be provided because the NVMMU can reduce the redundant memory copies and the user mode and kernel mode switching overheads as described above.

While it has been described in above embodiments of the present invention that the GPU and SSD are examples of the coprocessor and non-volatile memory, respectively, a data transfer method (i.e., NVMME) according to an embodiment of the present invention may be applied to other coprocessors and/or other file I/O-based non-volatile memories.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A memory management device for a computing device including a central processing unit (CPU), a non-volatile memory used as a storage, a coprocessor, and a coprocessor memory that stores data to be processed by the coprocessor or data processed by the coprocessor, the memory management device comprising:
    a controller driver that exposes a memory space used by the CPU to the coprocessor memory; and
    a library that moves the data to be processed by the coprocessor or the data processed by the coprocessor between the coprocessor and the non-volatile memory via the memory space exposed to the coprocessor memory,
    wherein the controller driver manages a register which includes a plurality of entries for pointing addresses of the memory space.

2. The memory management device of claim 1, wherein each entry points a logical block address of a space with a predetermined size in the memory space, and the logical block address corresponds to a physical block address of a space with a predetermined size in the coprocessor memory.

3. The memory management device of claim 2, wherein, when the coprocessor reads read data from the non-volatile memory, the controller driver transfers the read data from the non-volatile memory to the space of the physical block address that corresponds to the logical block address pointed by a corresponding entry among the entries.

4. The memory management device of claim 2, wherein the computing device further includes a CPU memory used by the CPU, and the register is stored in a memory used by the CPU.

5. The memory management device of claim 1, wherein the library resides on top of a native file system in a software stack.

6. The memory management device of claim 1, wherein the computing device further includes a CPU memory used by the CPU, and
    wherein the memory space is appended to the CPU memory.

7. A memory management device for a computing device including a central processing unit (CPU), a non-volatile memory used as a storage, a coprocessor, and a coprocessor memory that stores data to be processed by the coprocessor or data processed by the coprocessor, the memory management device comprising:
    a controller driver that manages a plurality of entries for pointing a system memory area used by the CPU, wherein each of the entries points a logical block address of a space with a predetermined size in the system memory area, and the logical block address corresponds to a physical block address of a space with a predetermined size in the coprocessor memory; and
    a library that moves the data to be processed by the coprocessor or the data processed by the coprocessor between the coprocessor and the non-volatile memory via the system memory area.

8. The memory management device of claim 7, wherein, when the coprocessor reads read data from the non-volatile memory, the controller driver transfers the read data from the non-volatile memory to the space of the physical block address that corresponds to the logical block address pointed by a corresponding entry among the entries.

9. The memory management device of claim 7, wherein the library resides on top of a native file system in a software stack.

10. A non-transitory computer-readable recording medium that stores a program to be executed by a computing device including a central processing unit (CPU), a non-volatile memory used as a storage, a coprocessor, and a coprocessor memory that stores data to be processed by the coprocessor or data processed by the coprocessor, the program comprising:
  a controller driver that exposes a memory space used by the CPU to the coprocessor memory; and
  a library that moves the data to be processed by the coprocessor or the data processed by the coprocessor between the coprocessor and the non-volatile memory via the memory space exposed to the coprocessor memory,
  wherein the controller driver manages a register which includes a plurality of entries for pointing addresses of the memory space.

11. The non-transitory computer-readable recording medium of claim 10, wherein each entry points a logical block address of a space with a predetermined size in the memory space, and the logical block address corresponds to a physical block address of a space with a predetermined size in the coprocessor memory.

12. The non-transitory computer-readable recording medium of claim 11, wherein, when the coprocessor reads read data from the non-volatile memory, the controller driver transfers the read data from the non-volatile memory to the space of the physical block address that corresponds to the logical block address pointed by a corresponding entry among the entries.

13. The non-transitory computer-readable recording medium of claim 11, wherein the computing device further includes a CPU memory used by the CPU, and the register is stored in a memory used by the CPU.

14. The non-transitory computer-readable recording medium of claim 10, wherein the library resides on top of a native file system in a software stack.

15. The non-transitory computer-readable recording medium of claim 10, wherein the computing device further includes a CPU memory used by the CPU, and
  wherein the memory space is appended to the CPU memory.

16. A non-transitory computer-readable recording medium that stores a program to be executed by a computing device including a central processing unit (CPU), a non-volatile memory used as a storage, a coprocessor, and a coprocessor memory that stores data to be processed by the coprocessor or data processed by the coprocessor, the program comprising:
  a controller driver that manages a plurality of entries for pointing a system memory area used by the CPU, wherein each of the entries points a logical block address of a space with a predetermined size in the memory space, and the logical block address corresponds to a physical block address of a space with a predetermined size in the coprocessor memory; and
  a library that moves the data to be processed by the coprocessor or the data processed by the coprocessor between the coprocessor and the non-volatile memory via the system memory area.

17. The non-transitory computer-readable recording medium of claim 16, wherein, when the coprocessor reads read data from the non-volatile memory, the controller driver transfers the read data from the non-volatile memory to the space of the physical block address that corresponds to the logical block address pointed by a corresponding entry among the entries.

18. The non-transitory computer-readable recording medium of claim 16, wherein the library resides on top of a native file system in a software stack.

* * * * *